United States Patent [19]

Schnizler et al.

[11] Patent Number: 5,028,858
[45] Date of Patent: Jul. 2, 1991

[54] CORDLESS DUAL-BATTERY ELECTRIC TOOL

[75] Inventors: Albrecht Schnizler, Nurtingen; Rolf Benzing, Neuffen, both of Fed. Rep. of Germany

[73] Assignee: Metabowerke GmbH & Co., Nurtingen, Fed. Rep. of Germany

[21] Appl. No.: 444,753

[22] Filed: Dec. 1, 1989

[30] Foreign Application Priority Data

Dec. 23, 1988 [DE] Fed. Rep. of Germany ....... 3844093

[51] Int. Cl.⁵ .................. H02J 7/00; H01M 10/46
[52] U.S. Cl. ................................. 320/2; 320/13; 320/17; 320/48
[58] Field of Search .............. 320/2, 13, 15, 17, 48; 362/20

[56] References Cited

U.S. PATENT DOCUMENTS

| | | |
|---|---|---|
| 3,973,179 | 8/1976 | Weber et al. ..................... 320/2 |
| 3,999,110 | 12/1976 | Ramstrom et al. .................. 320/2 |
| 4,150,302 | 4/1979 | Roche .......................... 362/20 X |
| 4,229,688 | 10/1980 | Knox et al. ..................... 320/13 X |
| 4,622,508 | 11/1986 | Matteau et al. ................... 320/13 |
| 4,871,956 | 10/1989 | Barrella ........................ 320/32 X |

Primary Examiner—R. J. Hickey
Attorney, Agent, or Firm—Baxley, Charles E.

[57] ABSTRACT

A cordless electrical tool has a housing forming a pair of battery mounts, an electrical motor in the housing, respective batteries removably carried in the mounts, and circuitry connecting the batteries in series with each other and across the motor. A cutoff switch is connected in series between the batteries and the motor and can open to electrically disconnect the motor from the batteries. Respective control circuits detect the charge levels of the batteries and open the cutoff switch when the respective charge level drops below a predetermined threshold. Respective light-emitting diodes are provided to indicate which of the batteries is below its permissible charge.

6 Claims, 2 Drawing Sheets

CORDLESS DUAL-BATTERY ELECTRIC TOOL

FIELD OF THE INVENTION

The present invention relates to a cordless tool. More particularly this invention concerns such a tool having two separate battery packs.

BACKGROUND OF THE INVENTION

It is known, for example from German patent document 3,610,221, for a cordless electrical tool (by which term is meant any appliance such as a drill, hair dryer, blender, or the like) to have a pair of sockets or seats that can each receive a respective battery pack. An indicator for the charge level of each battery is provided as well as a switch that allows the motor of the tool to be disconnected from one of the batteries when its charge level is too low and connected to the other. In this manner it is possible to continue to operate at the most efficient high-charge level of the batteries and to avoid excessively depleting them.

Such an arrangement is rarely, however, capable of providing sufficient power for a heavy-duty tool such as a hammer drill. Even though it is known to connect batteries in series, in which case the voltages are added to one another, such a connection has the considerable disadvantage that it is possible to run one of the batteries down so much that it is ruined. In other words the tool might continue to run even though one of its series-connected batteries is fully discharged, in which case this discharged battery might be so excessively drained that it cannot be recharged.

OBJECTS OF THE INVENTION

It is therefore an object of the present invention to provide an improved dual-battery system for a cordless electrical tool.

Another object is the provision of such an improved dual-battery system for a cordless electrical tool which overcomes the above-given disadvantages, that is which allows the batteries to be used in series but that prevents damage to them caused by use when their charge levels are too low.

SUMMARY OF THE INVENTION

A cordless electrical tool according to the invention has a housing forming a pair of battery mounts, an electrical motor in the housing, respective batteries removably carried in the mounts, and circuitry connecting the batteries in series with each other and across the motor. A cutoff switch is connected in series between the batteries and the motor and can open to electrically disconnect the motor from the batteries, that is by disconnecting one side of the motor from the respective side of the series-connected batteries. Respective control circuits detect the charge levels of the batteries and open the cutoff switch when the respective charge level drops below a predetermined threshold.

Thus when the charge of either of the batteries goes below a critical limit, the whole tool is shut down. This ensures that one of the batteries will not be burnt out while the other still has a good charge. The user will merely replace the low-charge battery and continue work. Meanwhile the tool will have the high power that comes from using two batteries in series.

According to a feature of this invention the control circuit includes means for opening the cutoff switch when the voltage of either of the batteries drops below a predetermined level. More particularly the cutoff switch is a field-effect transistor and the circuit includes respective zener diodes connected across the batteries and having breakdown voltages corresponding to the limits.

The circuit includes respective transistors, connected to the anodes of the zener diodes so as to be rendered non conductive when the voltage applied by the batteries to the respective diodes is less than the respective breakdown voltages. Respective light-emitting diodes are provided for each battery so a to illuminate when the charge levels of the respective batteries go below the respective thresholds. These circuit includes transistors having outputs connected to the respective light-emitting diodes so as to conduct when the voltage applied by the batteries to the respective zener diodes is less than the respective breakdown voltages. The cathodes of the zener diodes are coupled to the transistor terminals connected to the light-emitting diodes.

DESCRIPTION OF THE DRAWING

The above and other objects, features, and advantages will become more readily apparent from the following, reference being made to the accompanying drawing in which.

SPECIFIC DESCRIPTION

Figure 2:
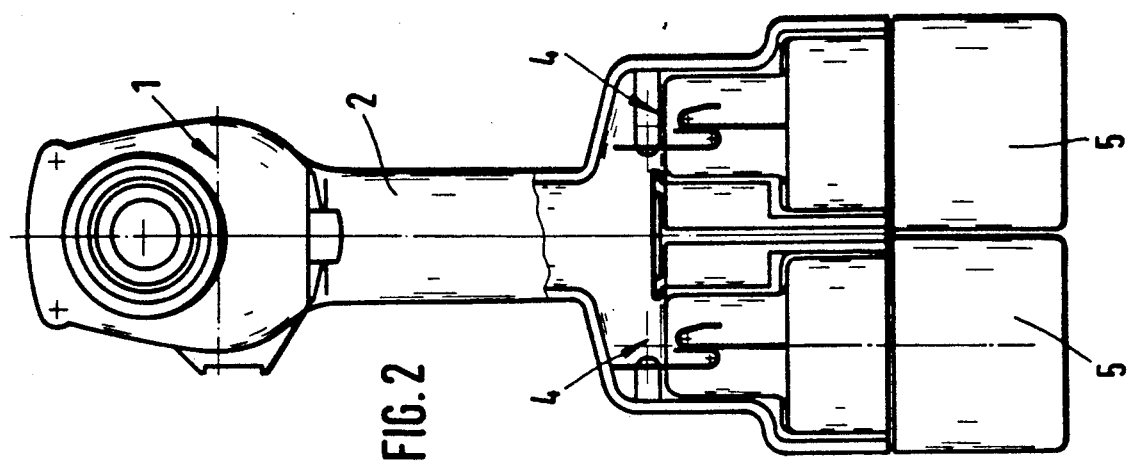
FIGS. 1 and 2 are side and front views, respectively, of the tool according to this invention.
Figure 1:
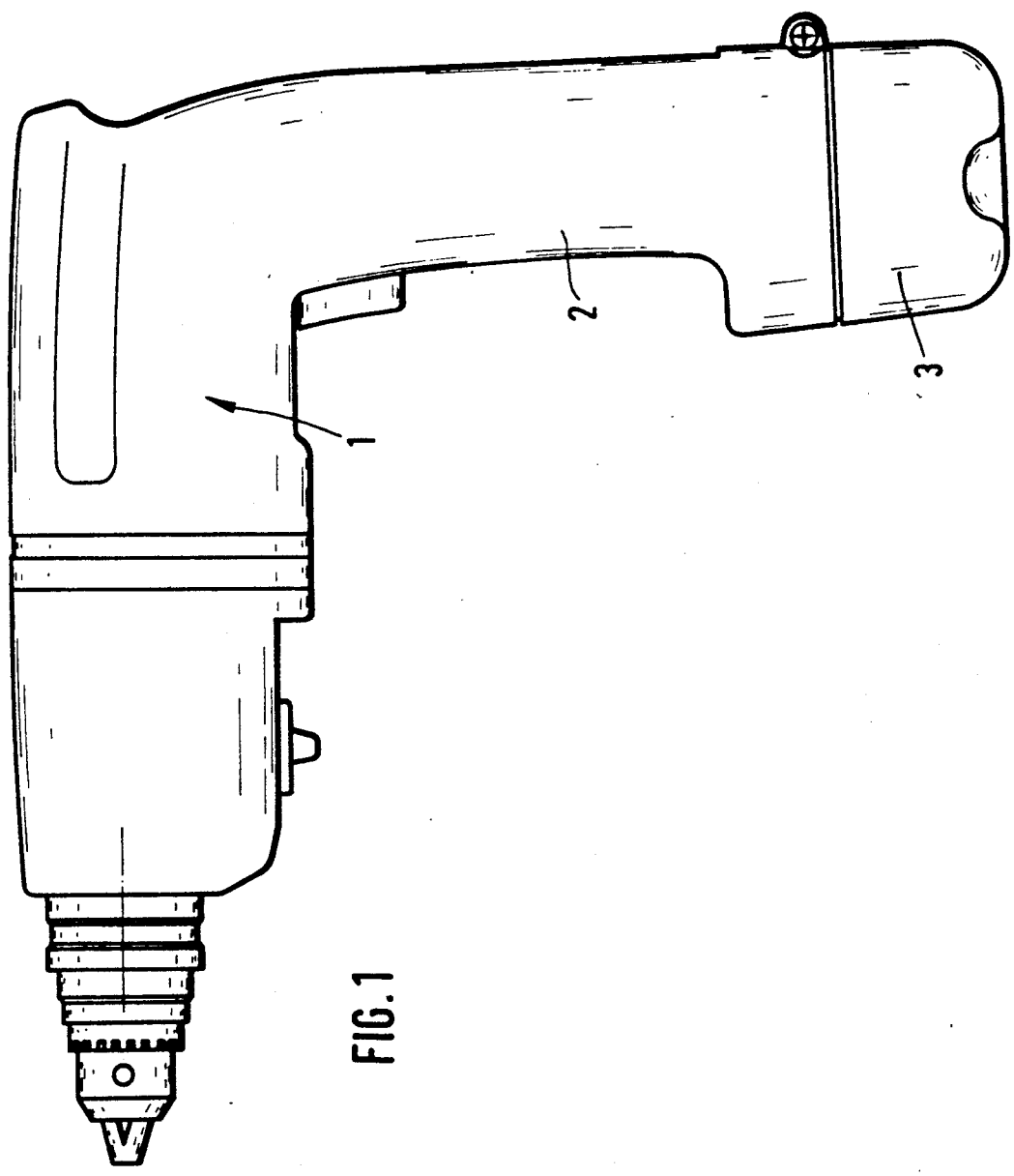
Figure 3:
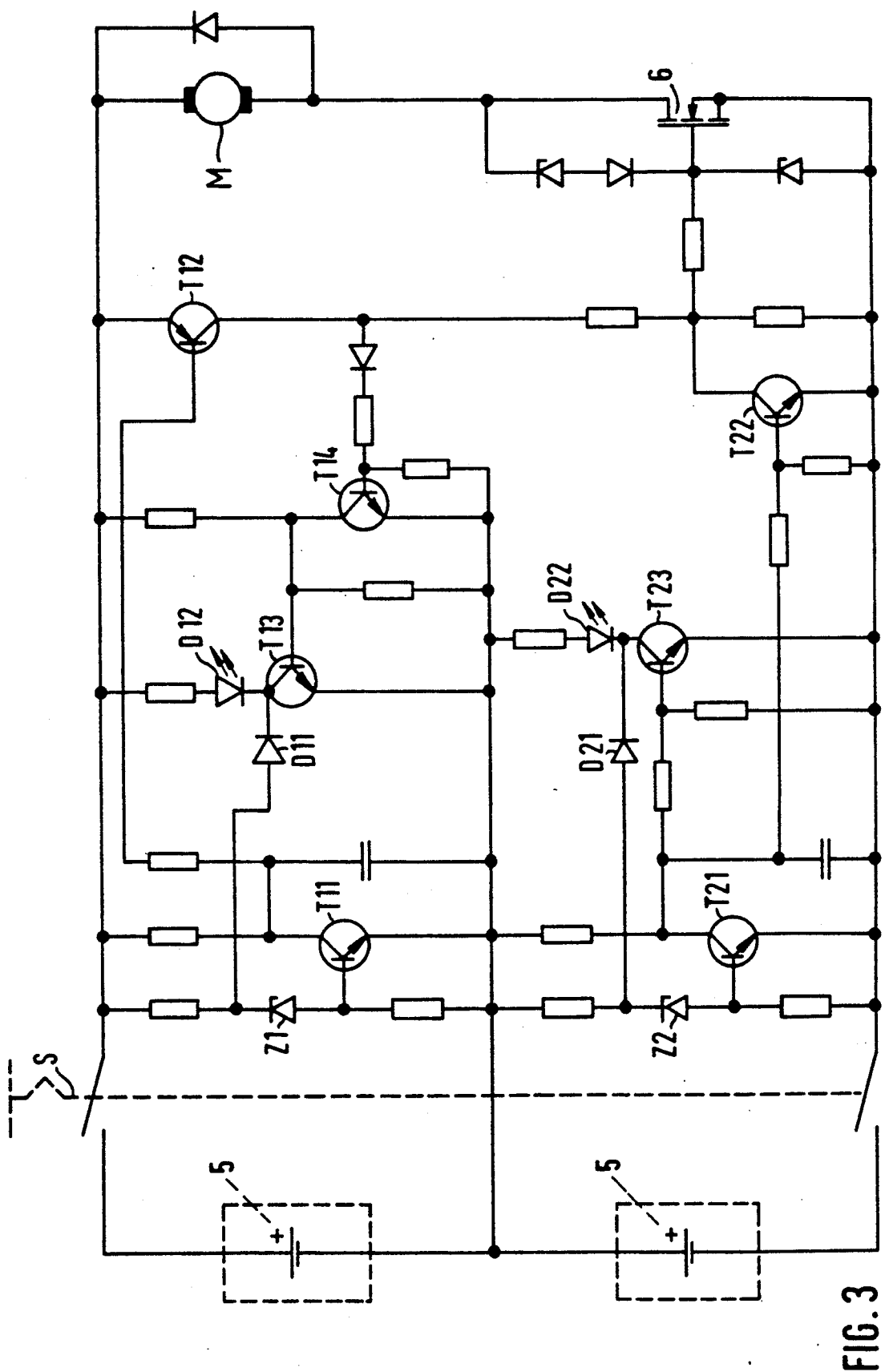
FIG. 3 is a schematic diagram illustrating the control circuit for the tool.

As seen in FIGS. 1 and 2 a hand drill 1 has a handle or grip 2 provided with a pair of seats or sockets 4 for respective battery packs 5 normally enclosed by a cover 3. These battery packs 5 ar identical but physically independent of each other and are connected in series so that the drill can be a relatively heavy-duty hammer drill in spite of its cordless construction.

The diagram of FIG. 2 illustrates how a motor M of the appliance 1 is connected across both of the batteries 5. A main switch S can completely disconnect the motor M from both sides of the series-connected batteries 5 and a field-effect transistor 6 acting as a protective switch is provided in the load circuit of the motor M. This transistor 6 can interrupt current flow through the motor M whenever the charge condition of either of the batteries 5 drops below a predetermined lower limit. To this end the switching transistor 6 is connected to a control circuit that serves to measure and compare the voltages of the batteries 5 so that when the voltage of either of the batteries 5 drops below a predetermined lower threshold a signal is fed to the gate of the transistor 6 so as to make it nonconducting and shut down the motor M.

At its input side the control circuit has a voltage divider with two zener diodes Z1 and Z2 whose breakdown voltages form the lower threshold for the respective battery packs 5. When this lower limit is reached for one of the batteries 5 the respective diode Z1 or Z2 becomes nonconducting so that the voltage at its anode changes. The base voltage of the following respective transistor T11 or T21 drops out so that it also becomes nonconducting.

When the transistor T11 ceases to conduct the base of a respective transistor T12 is deprived of voltage and it also ceases to conduct. Because the collector of the transistor T12 is connected to the gate of the field-effect transistor 6, this will have the effect of making this transistor 6 also nonconducting. Thus when the voltage output of the battery 5 connected via the zener Z1 and transistor T11 to the transistor 12 drops below the zener's breakdown voltage, the motor M is shut off. On the other hand the transistor T12 continues to conduct so long as the respective transistor T11 is powered through the respective zener Z1.

Similarly when the transistor T21 ceases to conduct, because the voltage of the respective battery 5 has fallen below the breakdown voltage of the respective zener diode Z2 the base of a respective transistor T22 goes high and the transistor is turned on. Because the collector of the transistor T22 is also connected to the gate of the field-effect transistor 6, this will have the effect of making this transistor 6 also nonconducting. Thus when the voltage output of the battery 5 connected via the zener Z2 and transistor T21 to the transistor 22 drops below the zener's breakdown voltage, the motor M is also shut off.

In addition the control circuit contains two transistors T13 and T23 whose emitter-collector junctions are each connected in series with a respective light-emitting diode D12 and D22. The transistor T13 receives at its base a control signal via a transistor T14 that turns on the transistor T13 when the transistor T12 is nonconducting. The collector voltage of T14 is applied to the base of the transistor T13. As a result when the voltage of the battery 5 connected to the transistor 13 drops below the cutoff threshold this transistor 13 will conduct and the respective diode D12 will light. Similarly the diode D22 can be illuminated by the transistor T23 because the transistor T21 directly creates the control signal for the transistor T23 because a base voltage is applied to the transistor T23 when the transistor T21 ceases to conduct when the respective battery's voltage is too low.

The collector of the transistor T13 is connected via a diode D11 with the cathode of the respective zener diode Z1. As soon as the transistor T13 conducts the cathode potential of the diode Z1 is set at such a low level that even if the voltage applied to the zener Z1 rises somewhat, for instance by manually cutting off the motor M and thereby reducing the battery load, this zener Z1 will not start to conduct again. This prevents the circuit from hunting or rapidly cutting the motor M in and out. The blocked condition is maintained until the switch S is actuated. The diode D21 that is connected to the collector of the transistor T23 has the same effect on the cathode of the other zener diode Z2.

We claim:

1. A cordless electrical tool comprising: a housing forming first and second battery mounts; an electrical motor in the housing; first and second batteries removably carried in said first and second mounts, respectively; said batteries being connected in series with each other and across said motor;

a cutoff switch connected in series between said batteries and said motor and openable to electrically disconnect said motor from said batteries; and means including a control circuit for detecting the charge level of each said battery and opening said cutoff switch when the charge level of either said battery drops below a predetermined threshold, said control circuit having first and second light-emitting diodes associated with said first and second battery mounts and hence with said first and second batteries, respectively, and means for turning either said diode on when the charge level of its said associated battery drops below said predetermined threshold, thus to provide visual indication of which said battery needs replacement.

2. The cordless tool defined in claim 1 wherein the cutoff switch is a field-effect transistor.

3. The cordless tool defined in claim 1 wherein the circuit includes respective zener diodes connected across the batteries and having breakdown voltages corresponding to the predetermined threshold.

4. The cordless tool defined in claim 3 wherein the circuit includes respective transistor connected to the anodes of the zener diodes so as to be rendered non-conductive by the batteries to the respective diodes is less than the respective breakdown voltages.

5. The cordless tool defined in claim 3 wherein the circuit includes transistors having outputs connected to the respective light-emitting diodes so as to conduct when the voltage applied by the batteries to the respective zener diodes is less than the respective breakdown voltages.

6. The cordless tool defined in claim 3 wherein the cathodes of the zener diodes are coupled to the transistor terminals connected to the light-emitting diodes.

* * * * *